United States Patent [19]

Dudnick

[11] Patent Number: 4,708,817

[45] Date of Patent: Nov. 24, 1987

[54] CREATIVE ART MEDIUM FOR FORMING ARTISTIC EXPRESSIONS HAVING A LATENT LUMINESCENT IMAGE PATTERN

[76] Inventor: Steven L. Dudnick, 7946 S. Kildare, Chicago, Ill. 60652

[21] Appl. No.: 894,618

[22] Filed: Aug. 8, 1986

[51] Int. Cl.[4] .............................................. C09K 11/06

[52] U.S. Cl. ................................ 252/301.16; 106/19; 106/20; 106/21; 106/22; 206/1.7; 252/301.33; 252/301.34; 252/301.35; 252/301.36

[58] Field of Search ...................... 252/301.16, 301.33, 252/301.34, 301.35, 301.36; 106/21, 20, 19, 22; 206/1.7

[56] References Cited

U.S. PATENT DOCUMENTS

| | | | |
|---|---|---|---|
| 2,056,809 | 10/1936 | Smith | 252/301.16 |
| 2,267,755 | 12/1941 | Sell | 252/301.16 |
| 2,347,644 | 5/1944 | Sell | 252/301.16 |
| 2,629,956 | 3/1953 | Switzer | 252/301.35 |
| 2,929,931 | 3/1960 | Richter et al. | 252/301.35 |
| 3,411,003 | 12/1968 | Pearce | 252/301.16 |
| 3,500,047 | 3/1970 | Berry | 252/301.10 |
| 3,650,589 | 3/1972 | Linger | 206/1.7 |
| 4,061,224 | 12/1977 | Fuhri | 206/1.7 |
| 4,252,845 | 2/1981 | Griffiths et al. | 106/21 |
| 4,525,295 | 6/1985 | Lister | 252/301.35 |

*Primary Examiner*—Arthur P. Demers
*Attorney, Agent, or Firm*—Silverman, Cass, Singer & Winburn, Ltd.

[57] ABSTRACT

A creative art medium by which artistic expression could take the form of a uniform color layer upon a substrate visible under normal lighting conditions defining a first image, the layer carrying a co-planar latent luminescent image which is not discernible under normal light conditions through present and visible, this latent image being visible and distinguishable only under darkness conditions, said latent image not being an overlay. The color compositions are color matched. Only one composition includes one of a luminescent, fluorescent and phosphorescent component and is employed to form the latent image side by side with the image formed by the other color matched composition.

9 Claims, 4 Drawing Figures

FIG. 1
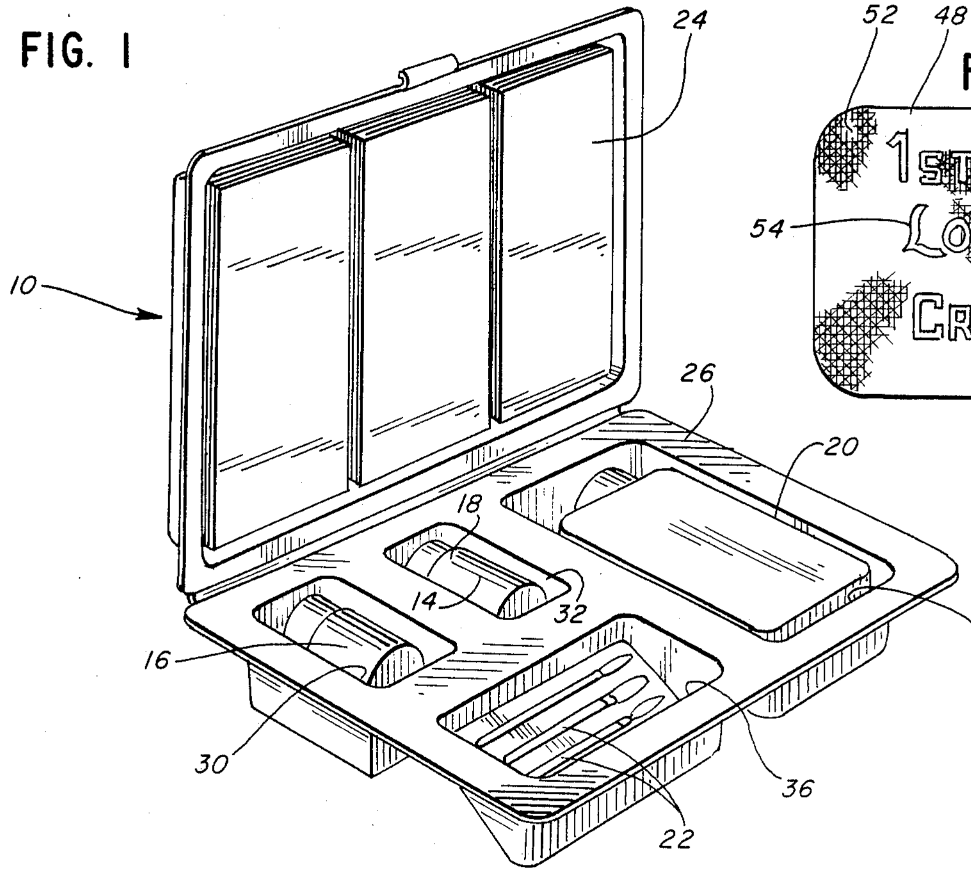
FIG. 4
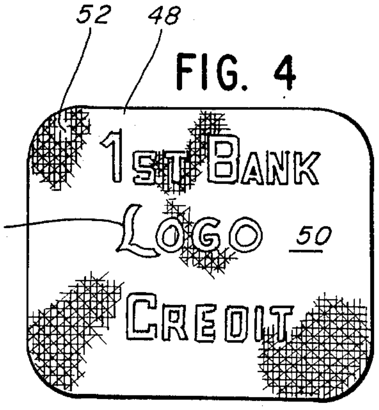
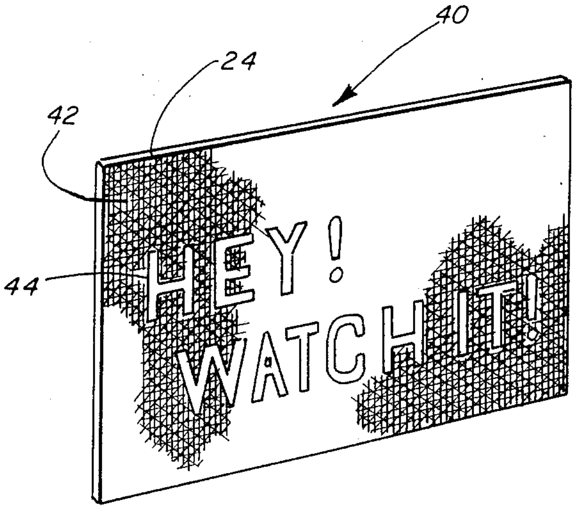
FIG. 2
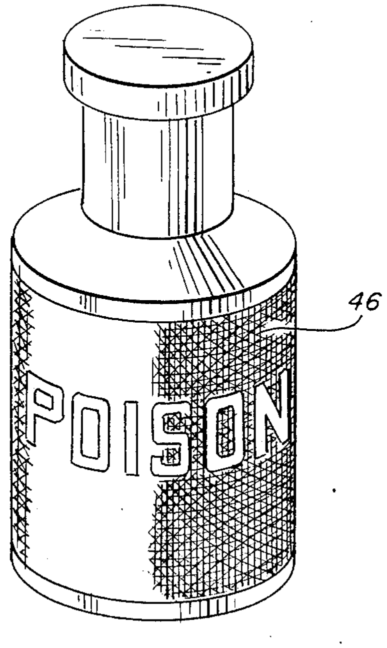
FIG. 3

CREATIVE ART MEDIUM FOR FORMING ARTISTIC EXPRESSIONS HAVING A LATENT LUMINESCENT IMAGE PATTERN

BACKGROUND OF THE INVENTION

This invention relates generally to art media and the like. More particularly, the invention provides a creative art medium kit which enables the user to create and render novel patterns for entertainment and commercial purposes, at least one pattern comprising a latent luminescent image.

The provision of different art materials is of substantial interest both artistically and commercially for rendering of patterns and other images. Artists seek new media for expression. Commercial creators seek new means to render and transmit impressions and to present ideas for advertising and/or commercialization. It is known to use luminescent materials, such as phosphors and/or fluorescent materials, to provide multiple images, some of which are visible under one lighting condition while others require different or other lighting conditions, such as exposure to fluorescent light, so-called black-light (ultra-violet light) and infra-red radiation. Materials which absorb selected wavelength radiation and as a result thereof, generate radiation of wavelength different from that of the incident light are well known and have been used to provide unusual visual displays. Generally, the respective patterns are visible under one light condition and invisible under another light condition.

It is known to provide pattern carrying members, such as wall covering materials, greeting cards, printing fabrics, and the like, wherein the scene or artistic representation for viewing under one type lighting condition is imprinted with ordinary inks and there is an overprinted artistic representation intended for viewing only under another condition, such as in darkness. The representation is imprinted using light-activiated phosphorescent inks which phosphoresce in a transparent printing vehicle. The representations usually are different either in expression or context. The essence of the presentation is that one representation is visible while the other, not visible under a selected light condition, becomes visible, for example, in total darkness.

One difficulty encountered using available materials is that both representations are visible and discernible under natural lighting conditions. This may occur due to the lack of color matching, the manner of applying such materials on a substrate or carrying surface, or other reasons.

It is known to illustrate objects under one kind of light and to depict "hidden" portions of the object under another different kind of light and to depict both portions simultaneously under mixed lighting sources. Luminous paint materials can be provided over which can be superimposed a generally conventional representation. Displays formed with such materials have remarkable depth as well as substantial brightness under ultra-violet light simultaneously with the showing of a conventional picture under visible light. Phosphorescent or luminescent material can be used in relatively coarse granular form as a base for a picture or display for visibility under ultra-violet light. The phosphorescent materials are required to be employed in considerable thickness to provide sufficient material to have substantial visible effects under moderate intensities of ultra-violet light. Superimposed over the phosphorescent material layer, either in part or entirely, is a conventional display of pigment which is essentially transparent to ultra-violet light and, as well, can transmit to a substantial degree, the light emitted by the luminous layer, said pigment being in fine granular form substantially finer than the phosphorescent materials. Here also, the concept is one of overlay where the two images or patterns are apparent, their edges being clearly discernible under ordinary light conditions.

SUMMARY OF THE INVENTION

This invention provides a creative art medium by which artistic expression takes an initial form of a uniform color layer upon a substrate carrier, the layer consisting of at least two co-planar image patterns which are color matched, identical in hue and physical characteristics and which patterns under natural light, are substantially indistinguishable under casual examination; one image pattern becomes discernible under other than a natural light condition such as darkness, said one image pattern emitting visible radiation while the other does not, the material of said one pattern including a fluorescent, luminescent or phosphorescent composition. A feature of the invention to be able to provide a kit for creating the desired art medium.

BRIEF DESCRIPTION OF THE DRAWINGS

FIG. 1 is a perspective view of a creation kit for creating the creative art medium of the invention.

FIG. 2 is an elevational view of an artistic expression employing the creative art medium of the invention in the form of a "hidden message" card.

FIG. 3 illustrates another use of the invention in the form of a warning message on a container.

FIG. 4 illustrates the invention as embodied in the form of a credit card.

DESCRIPTION OF THE PREFERRED EMBODIMENT

This invention shall be described as employed in the forming of creative art projects as artistic expression or expressions having considerable commercial value or appeal. For example, a display card can be prepared wherein a latent message can be provided in a background display, said message being indistinguishable under natural light conditions but becoming visibly apparent in darkness. Two or more scenes or artistic compositions on a single carrier, one being discernible from the other under one light condition and indistinguishable from each other under a different light condition can be realized.

Referring to FIG. 1, a creative art medium kit according to the invention is designated by reference character 10. The art medium kit 10 is provided with at least a pair of containers 12, 14 each holding a color-matched, generally identical pigment 16, 18 in powder form. A container 20 is provided for holding a liquid suspending vehicle for the pigments 16 and 18. Brushes 22 and other applicator means also are included in the kit 10. The kit 10 also may include a substrate 24, such as paper, canvas board, cardboard seconds or simlar material, capable of serving as a base to carry the pattern or patterns forming the artistic expression desired.

The pigments 16 and 18 desirably are identical, having been color-matched employing spectrophotographic means and having identical texture, grain size, hue. The pigments 16 and 18 have the same physical and chemical characteristics. Pigments 16 and 18 differ only in that pigment 18 includes a predetermined quantity of phosphorescent material, phosphor, or similar "glow in the dark" composition.

The kit 10 further includes a carrier or tray 26 which has a molded plastic base 28 having unitary cavities 30, 32, 34 and 36 therein for receiving the containers 12, 14 and 20 respectively, as well as the brushes 22. The suspending vehicle is conventional in the paint field, such as xylol, vegetable oil, toluol or cellosolve. The substrates 24 can be seated within the cover 38 of carrier 26.

The specific project to be described herein is the formation of a "hidden message" novelty card 40 illustrated as completed in FIG. 2. The pigments 16, 18 in the respective containers 12 and 14 are mixed carefully with a selected volume of suspending vehicle to provide a suspension of each having the same viscosity. Suspended pigment 16 is applied to board 24 using one of the brushes 22 to define a pattern 42. The applied pattern 42 consists of smooth, even strokes forming a coating of uniform thickness, and dried. The suspended pigment 18 otherwise identical to pigment 16 but carrying the phosphor is applied in a second pattern 44 which fills in the non-coated portions of the board 24 to form the message as a latent or non-discernible image under natural light conditions. When dried, pattern 44 is substantially indistinguishable to the human eye under normal or natural light conditions, i.e., one viewing the coated board 24 casually cannot distinguish the edges of pattern 42 from the edges of pattern 44. The patterns 42 and 44 are co-planar; the blending of the borders is apparent.

Note that both co-planar patterns 42 and 44 are present on the substrate and appear as only one uniform coating under natural light conditions. However, during exposure to normal or natural light, pattern 44 is absorbing said light and has the characteristic of re-emitting said light subsequent to such exposure. The pattern 42 is incapable of absorbing light and re-emitting such light. Therefore, when the natural lighting condition is changed to one of darkness, the pattern 44 becomes visible while the pattern 42 is not apparent. Thus the once latent message becomes clearly visible.

Another use for the kit 10 of the invention is to apply a warning label or message to a container for a harmful substance, for instance, the legend POISON to a container. As shown in FIG. 3, a container 46 is employed or intended to be employed for a dangerous material, for instance, a corrosive detergent. The container or a portion thereof is coated with suspended pigment 16 except surrounding the legend POISON to be scribed on the container 46 using the suspended pigment 18. Thus, in natural light, the legend POISON is not discernible. The container 46 normally is stored in darkness, such as in a medicine cabinet, where the warning message glows and is clearly discernible.

In FIG. 4, the invention is illustrated as applied to a substrate 48 formed of plastic, cardboard or the like, which can be employed as a credit card, for example. The surface 50 of said substrate 48 carries a pattern 52 formed of the pigment composition 16. The substrate surface 50 also carries a pattern 54 coplanar with pattern 52. The pattern 54 is formed of pigment composition 18 and will be discernible from pattern 52 only under certain select lighting conditions, here, darkness. Thus when the substrate 48 is viewed in darkness, the pattern 54, here in the form of a credit card originator's logotype or service mark, will become clearly discernible, identifying the issuer of the credit card to the viewer. A light transmissive coating (not shown) can be applied as a sealing or protective overcoat if desired.

The construction of a work of art employing the invention can be an exercise in creativity. Two or more images can be applied to a single base to include hidden or latent visual effects as well as composition which can incorporate ordinary or conventional media along with the color matched pigments 16 and 18 of the invention. The artist can employ substrates of varying texture and composition such as board, canvas, silk, paper, matboard, etc. The enchanced pigment 18 is applied in desired form to constitute an image to be made distinguishable only under lighting conditions under which the enhanced pigment is phosphorescent, or as the case may be luminescent or fluorescent. The image formed with the enhanced pigment is not discernible under light conditions that do not cause the enchanced pigment to emit light. Once activating light conditions are present, discernibility of the said image is effected. The creative art medium provided by the invention not only has advantage in artistry and creative expression, but is well capable of use in providing unique and appealing commerical utilizations of considerable versatility.

One example of a phosphorescent pigment which has been employed to form the creative art medium of the invention is sold under the trademark GLO PIGMENT By Canrad-Hanovia, Inc., of Newark, N.J. The GLO-PIGMENT Series 1000 is an inorganic zinc sulfide phosphor with double activators prepared in high temperature ovens and characterized by its thermal stability and high "after glow" properties. The normal concentration of pigment to carrier is 30%, excellent results being obtained within the ranges of 10 to 20% as well. The pigment has been found to be non-toxic. Instead of employing a conventional suspending vehicle, the pigments of the invention can be suspended in a conventional paint such as sold under the trademark BENJAMIN MOORE "Regal Wall Satin Latex Interior Flat Paint." The same paint is employed for both the normal pigment 16 and the enhanced pigment 18.

Inasmuch as luminescent, phosphorescent and fluorescent materials are well known, no specific examples of such materials need be given in addition to the preferred composition described above. General examples of suitable fluorescent materials include indigo blue, logwood purple, cochinerl, sulphide containing materials such as metallic barium compositions, chromium oxides, cadmium sulphates and selenides, among others.

What I claim is:

1. A creative art medium comprising at least a pair of identical color matched pigment compositions, one of said pair including a light absorbent, light emitting component, said pair of compositions being in a coatable liquid vehicle for application to a substrate in at least a pair of coplanar patterns, said patterns being present side by side yet indistinguishable under one lighting condition, said one of said pair being distinguishable from the others under a different lighting condition due to light emitted only therefrom.

2. The art medium as claimed in claim 1 in which said light absorbent component is selected from one of a phosphorescent, luminescent, or fluorescent composition.

3. The art medium as claimed in claim 1 in which said light absorbent component is a phosphor.

4. A creative art medium in kit form comprising a carrier having a cover, said carrier having cavities formed therein for receipt of components of said kit said components including at least a pair of identical color matched pigment compositions, one of said compositions being enhanced with a light absorbent and light emitting component, a liquid vehicle for forming said compositions into applicable coating capability, applicators for each composition and substrate means to receive said compositions, said compositions being applied in at least a pair of co-planar patterns in side by side array, the pair of thus formed patterns being indistinguishable in natural light, but the enhanced composition only being distinguishable under other light conditions.

5. The creative art medium in kit form as claimed in claim 4 in which said light absorbent component is selected from one of a phosphorescent, luminescent or fluorescent composition.

6. The creative art medium in kit form as claimed in claim 4 in which said light absorbent component is a phosphor.

7. A carrier substrate having a surface to which a creative art medium is applied comprising, at least a pair of identical color matched pigment compositions, one of said pair including a light absorbent, light emitting component, said pair of compositions being in a coatable liquid vehicle applied on the surface in at least a pair of co-planar patterns, said patterns being present side by side yet indistinguishable under one lighting condition, said one of said pair being distinguishable from the others under a different lighting condition due to light emitted only therefrom.

8. The substrate as claimed in claim 7 in which said light absorbent component is selected from one of a phosphorescent, luminescent, or fluorescent composition.

9. The substrate as claimed in claim 7 in which said light absorbent component is a phosphor.

* * * * *